Figure 3:
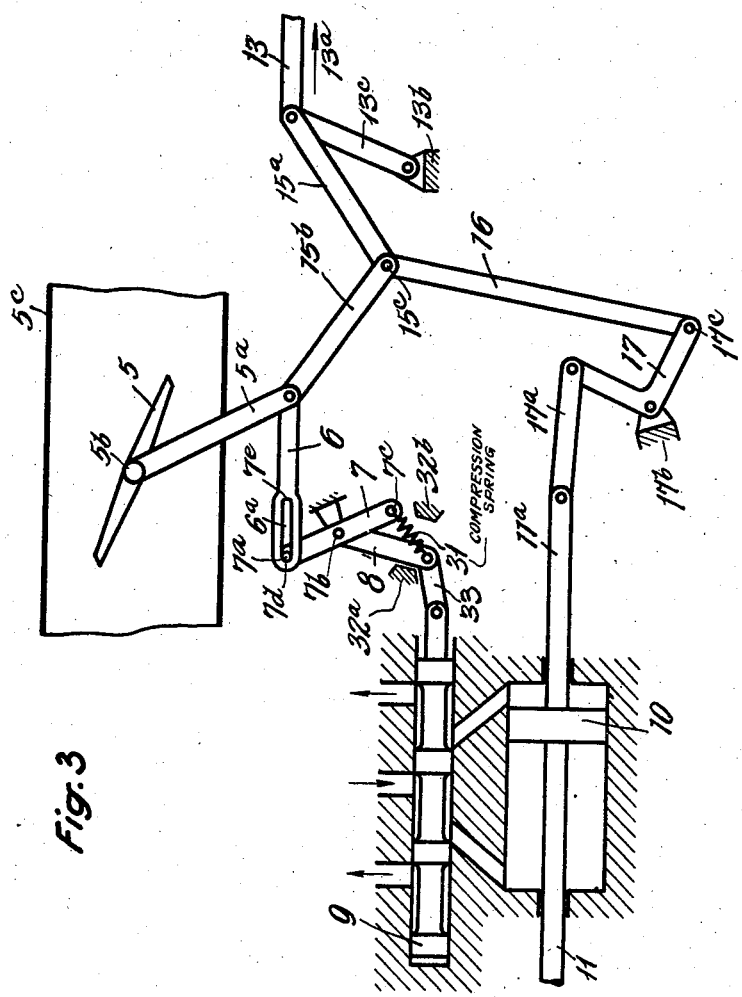

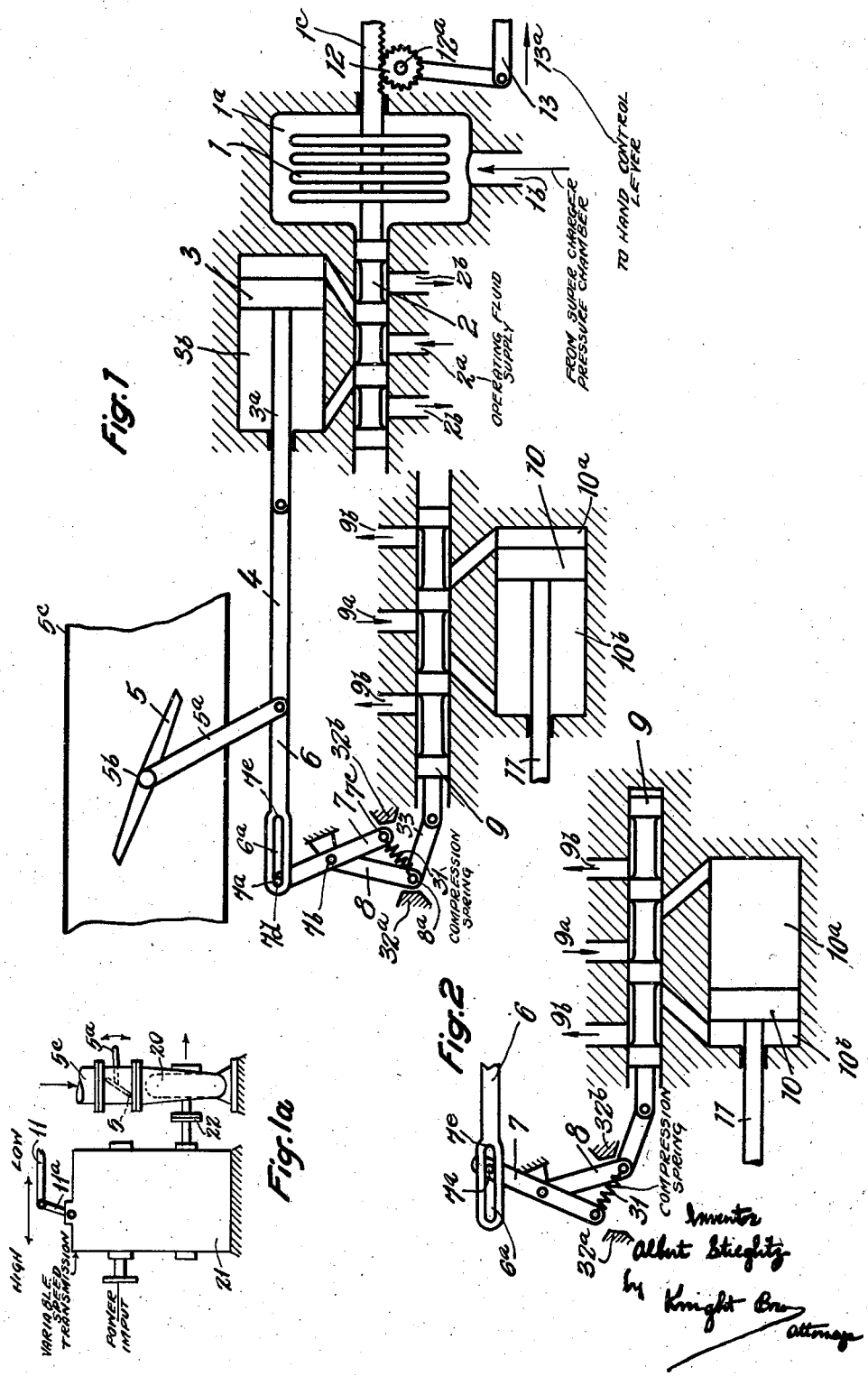

Aug. 22, 1944.   A. STIEGLITZ   2,356,124
SUPERCHARGER
Filed May 4, 1938   2 Sheets-Sheet 2

Inventor
Albert Stieglitz
by Knight Bros
attorneys

Patented Aug. 22, 1944

2,356,124

UNITED STATES PATENT OFFICE 2,356,124

SUPERCHARGER

Albert Stieglitz, Berlin-Spandau, Germany; vested in the Alien Property Custodian Application May 4, 1938, Serial No. 205,992
In Germany March 16, 1937

4 Claims. (Cl. 230—114)

This invention relates to regulating devices for superchargers of internal combustion engines, the supercharger being driven by the engine through a gearing having at least two steps.

A supercharger for an internal combustion engine assists the output of the engine by compressing the combustion air or the mixture of air and fuel. In the case of aircraft the supercharger is furthermore intended to maintain the output at high altitudes. The regulation is then effected by influencing the charging pressure by means of a throttle valve which controls for instance the intake of the supercharger. The speed transmission for the drive of the supercharger is so chosen that the desired maximum output is attained at the desired altitude. Consequently, at lower altitudes and on the ground the intake of the supercharger must be throttled down in order that the maximum permissible charging pressure shall not be exceeded. This is naturally uneconomical and disadvantageous since it is accompanied by losses and increased fuel consumption. Furthermore, the charging air is heated by the partially idle running of the supercharger, and the danger of knocking is thereby increased.

These difficulties can be considerably reduced by subdividing the transmission ratio of the supercharger drive by means of a change-over gear. The amount of throttling is thus reduced by providing two or more speed ranges for the supercharger.

With a view to ensuring ready and correct actuation of the speed variation, with consequent efficient utilization of the supercharger at all times, there is provided, according to the invention, an automatic operation which effects the change-over of the gear ratio at the correct instant and in accordance with working conditions. The changing over of the ratio is initiated at the limits of a given range of regulation of the internal combustion engine, within which the prevailing speed of the supercharger may remain, by means connected to the regulating system and which come into action in one or the other operating direction when one or the other limit of the range has been reached. Since the change-over is mainly dependent upon the position of the throttle determining the charging pressure, the change-over preferably takes place by means of the system operating in conjunction with the control of the throttle.

The change-over point for producing a higher speed of the supercharger is always definitely determined by the completely open position of the throttle valve. On the other hand, the change-over from a high supercharger speed to a lower speed must take place at a definite partially closed throttle position.

Two arrangements, each according to the invention, are shown diagrammatically and by way of example in the accompanying drawings, Fig. 1 semi-diagrammatically represents a form of indirect throttle control in which the invention may be reduced to practice, the device being shown in one operating position;

Fig. 1a diagrammatically shows the supercharger with its change-speed gear;

Fig. 2 represents the same modification as Fig. 1, shown in a second operating position, and Fig. 3 represents a modification of the invention in which the throttle is controlled directly by the operator.

Referring first to Fig. 1a, the supercharger 20 is driven from a suitable power supply by way of a variable speed transmission 21 of any conventional construction, and with which it is connected by way of a coupling 22. 5 is a throttle for controlling the amount of air passing through the supercharger and the throttle may be arranged for instance as shown in the intake pipe of the supercharger 20.

In the modification of the entire arrangement according to the invention as shown in Fig. 1, this throttle is controlled by the operator indirectly in the following manner. 1 is a Sylphon bellows, containing a gas of suitable pressure, this bellows being disposed in a chamber 1a which is connected by way of a duct 1b with the pressure conduit (not shown) which connects the supercharger with its internal combustion engine, so that in case the charging pressure increases the bellows is compressed; while it expands when the supercharger pressure drops. The point at which bellows 1 is supported is a control bar 1c which is formed in the shape of a rack bar and meshes with a pinion 12 journaled on a fixed axle 12a. This pinion is actuated by the operator by means of hand-controlled lever 13 which, after the operator has moved the lever to the desired extent, can be set in a fixed position in any conventional manner. With the other side of Sylphon bellows 1 is connected the piston valve 2 of a servomotor 3 which is supplied with pressure fluid from a central conduit 2a by way of the piston valve. 2b, 2b represent the discharge ports for the fluid pressure. The piston rod 3a of the servomotor piston 3 is connected by way of connecting rod 4 with the control arm 5a of throttle valve 5, the latter being pivoted at 5b. Thus if the servomotor piston moves to the right throttle 5 is opened further, if the piston is moved to the left the throttle is closed. Connecting rod 4 is extended beyond arm 5a and is slotted at its end, the slot 6a being of a given length. In this slot is disposed the upper or control end of lever 7 of a toggle joint 7, 8, by means of a pin 7a. Toggle joint lever 7 is pivoted at 7b together with lever 8, the free end of which latter carries attached to it one end of a compression spring 31, the other end of which spring is attached to the free end of lever 7 at 7c. The end 8a of lever 8 normally rests against a fixed stop 32a. Opposite to this stop and spaced a distance therefrom, representing the throw of the toggle joint, is another fixed stop 32b against which the toggle joint rests in the other position shown in Fig. 2 and to be referred to later on. To the end 8a of lever 8 is pivotally attached a connecting rod 33 which is connected at its other end to a piston valve 9 which controls the servomotor piston 10 for the purpose of actuating the gear control rod 11. The pressure fluid for this servomotor is supplied at 9a while it is discharged from the ports 9b, 9b. This gear control rod 11 as shown in Fig. 1a, is attached to the actuating arm 11a of the variable speed transmission so that when the piston rod 11 moves to the left the gear is thrown into high speed and when it is moved to the right it is moved to low speed. The arrangement shown in Fig. 1 operates as follows. The aforementioned slot 6a as will be noted from the foregoing description, forms a lost motion connection between throttle 5 and toggle joint 7, 8 so that within given limits determined by the length and position of slot 6a the throttle may be moved by the operator without actuating the toggle joint. Let us now assume that the intake valve 5 of the supercharger is closed a trifle more than is shown in Fig. 1. In that case pin 7a of the toggle joint will stand somewhere intermediate the ends of slot 6a. As soon as the operator desires to open throttle 5 very wide beyond the range permitted by the lost motion connection of slot 6a (by pulling the throttle rod 13 in the direction of the arrow 13a), the system, including operating bar 1c, the Sylphon bellows 1 and piston valve 2, being a more or less rigid system moves together to the left and thereby pressure fluid is permitted to pass from the supply conduit 2a into the cylinder space 3b at the left side of servomotor piston 3. Thus piston 3 is moved to the right and thereby pulls connecting rod 4 to the right and thus opens throttle 5 further. This increases the amount of air admitted to the supercharger and thereby increases the charging pressure and thus the pressure in Sylphon bellows chamber 1a increases slightly. Since the operator has in the meantime again locked his operating bar 13 the aforementioned system, including the Sylphon bellows, is rigidly held at its right hand end and thus when the Sylphon bellows contracts due to the increased pressure in chamber 1a, it pulls piston valve 2 to the right. This interrupts the pressure fluid supply to cylinder space 3b and the piston stops. If the operator has, however, moved the operating bar 13 quite extensively to the right in order to open throttle 5 very wide, extension 6 of the connecting rod 4 engages at the left hand end of its slot 6a the operating pin 7a of the toggle joint and snaps the latter through its dead center so that it will assume the position shown in Fig. 2. Thereby the piston valve 9 of servomotor 10 is moved to the right as shown in Fig. 2, thereby admitting pressure fluid to the portion 10a of the servomotor 10 which pushes the piston 10 to the left into the position shown in Fig. 2. Thus the gear shifting bar 11 moves the lever 11a of the variable speed transmission 21 in Fig. 1a to the left and throws it into high gear, thus changing the speed of the supercharger from a lower to a higher speed. If, on the other hand, the operator with the entire system now in a condition illustrated in Fig. 2, in which the throttle is open, desires to close the throttle to a considerable extent, he operates his lever 13 the reverse way which brings about a reversal of the action of the entire system and moves the change gear bar 11 in the other direction and returns the gear shift lever to a lower gear as shown in Fig. 1a.

In the modification shown in Fig. 3 essentially the same general construction of the system is maintained so far as the servomotor 10, the toggle joint 7, 8, the throttle and the transmission gear are concerned. In this case, however, the throttle 5 is not controlled indirectly by means of a special servomotor piston 3 as in Fig. 1, but directly by means of the operating bar 13 by way of two intermediate levers 15a and 15b, the latter being connected at its other end to the throttle arm 5a. The operator's bar 13 is pivotally supported on a swinging arm 13c pivoted at 13b at a fixed point. In addition to this arrangement the following connection is made for the intermediate levers 15a and 15b and servomotor 10. The servomotor piston rod is extended beyond the opposite end of the servomotor cylinder as shown at 11a and connected by means of a connecting rod 17a to a bell crank 17 pivoted at 17b. The other arm 17c of the bell crank is linked to a control bar 16, the other end of which is pivotally connected to the connecting point 15c between links 15a and 15b. If the piston 10 is for instance in the position shown in Fig. 3, the bell crank 17 is held rigid and thus the operator may actuate the throttle directly by way of links 15a, 15b within the range permitted by the length of slot 6a. In that case point 15c merely describes a circle determined by the length of rod 16. Thus the same as in the case of Fig. 1 the toggle joint is not operated. If now, however, the operator shifts his control bar 13 a large amount to the right in order to open throttle 5 wide for increasing the supercharger output, which should rather call for increasing the speed of the supercharger, slotted bar 6 pulls the toggle joint 7, 8 to snap through to the opposite position from that shown in Fig. 3, whereby piston valve 9 is shifted to the right and consequently servomotor piston 10 moves to the right, shifting the power transmission 21 of the supercharger to a higher speed as described with reference to Figs. 1, 2. However, the shifting of piston 10 has also the effect of turning bell crank 17 counter-clockwise, whereby connecting bar 16 is pushed up and straightens out somewhat the links 15a, 15b which in turn has the effect (assuming that at that time control bar 13 has been set by the operator) of somewhat closing again throttle 5 in order to throttle the air intake in view of the new speed of the supercharger in order to maintain the desired pressure. If, on the contrary, the pilot wishes to close the throttle 5 by a large amount in order to reduce the supercharger pressure, the reverse function of the mechanism occurs, namely piston 10 moves to the right, shifts the transmission into low gear, turns bell crank 17 clockwise, pulling bar 16 down, thereby causing reopening of the throttle 5 by a certain amount from the extreme closing position into which the operator had originally pulled it in order to reduce the supercharger pressure.

What is claimed is:

1. A regulating device for the supercharger of an internal combustion engine having a throttle arranged in the supercharger for controlling its charging pressure, a variable speed transmission for driving the supercharger, hand-controlled means for varying the throttle position, means for varying the ratio of said transmission and a toggle joint controlled by said throttle and disposed to actuate said speed varying means in accordance with the varying throttle positions beyond a given normal range, so that if the transmission is in a lower gear, it is adjusted to a higher gear when the throttle is opened wider, and if the transmission is in a higher gear it is adjusted into a lower gear when the throttle is moved toward closing position, said toggle joint having a lost motion connection with said throttle to permit within said given range variations of the throttle position without actuating said toggle joint and said speed ratio varying means.

2. A regulating device for the supercharger of an internal combustion engine having a throttle arranged in the supercharger for controlling its charging pressure, a variable speed transmission for driving the supercharger, hand-controlled means for varying the throttle position, a servomotor for varying the ratio of said transmission and a toggle joint controlled by said throttle and disposed to control the operation of said servomotor to vary the speed ratio of said transmission in accordance with the varying throttle positions, so that if the transmission is in a lower gear, it is adjusted to a higher gear when the throttle is opened wider, and if the transmission is in a higher gear it is adjusted into a lower gear when the throttle is moved toward closing position, said toggle joint having a lost motion connection with said throttle to permit within said given range variations of the throttle position without actuating said toggle joint and said speed ratio varying means.

3. A regulating device for the supercharger of an internal combustion engine having a throttle arranged in the supercharger for controlling its charging pressure, a variable speed transmission for driving the supercharger, hand-controlled means for varying the throttle position, a servomotor for varying the ratio of said transmission and a toggle joint controlled by said throttle and disposed to control the operation of said servomotor to vary the speed ratio of said transmission in accordance with the varying throttle positions, so that if the transmission is in a lower gear, it is adjusted to a higher gear when the throttle is opened wider, and if the transmission is in a higher gear it is adjusted into a lower gear when the throttle is moved toward closing position, said toggle joint having a lost motion connection with said throttle to permit within said given range variations of the throttle position without actuating said toggle joint and said speed ratio varying means, and means responsive to the supercharger pressure variation resulting from a supercharger speed change, for slightly moving the throttle in a direction contrary to the direction in which it was moved by hand to bring about the aforesaid speed change to return the throttle to within said given normal operating range.

4. A regulating device for the supercharger of an internal combustion engine having a throttle arranged in the supercharger for controlling its charging pressure, a variable speed transmission for driving the supercharger, hand-controlled means for varying the throttle position, a servomotor for varying the ratio of said transmission and a toggle joint controlled by said throttle and disposed to control the operation of said servomotor to vary the speed ratio of said transmission in accordance with the varying throttle positions, so that if the transmission is in a lower gear, it is adjusted to a higher gear when the throttle is opened wider, and if the transmission is in a higher gear it is adjusted into a lower gear when the throttle is moved toward closing position, said toggle joint having a lost motion connection with said throttle to permit within said given range variations of the throttle position without actuating said toggle joint and said speed ratio varying means, and means controlled by said servomotor for slightly moving the throttle in a direction contrary to the direction in which it was moved by hand to bring about a supercharger speed change in a given direction, to return the throttle to within said given normal operating range.

ALBERT STIEGLITZ.